United States Patent Office 3,644,332
Patented Feb. 22, 1972

3,644,332
PREPARATION OF GRANULAR STARCH DERIVATIVES
Robert A. Mooth, Tinley Park, and Stanley F. Ciesla, Brookfield, Ill., and Hugh J. Roberts, Wauwatosa, Wis., assignors to CPC International Inc.
No Drawing. Filed Sept. 5, 1968, Ser. No. 757,761
Int. Cl. C08b 19/01
U.S. Cl. 260—233.3        1 Claim

ABSTRACT OF THE DISCLOSURE

Derivatives of starch heretofore unattainable by aqueous reaction techniques as well as increased efficiency of attainable derivative formulations by aqueous reaction techniques are achieved by reacting a hydrophobic reagent with a granular starch in a three phase system comprised of (1) granular starch (2) water, and (3) a hydrophobic reagent which is emulsified in the continuous aqueous phase by an emulsifier.

BACKGROUND OF THE INVENTION

This invention relates to granular starch derivatives. More specifically, this invention relates to efficient methods of making derivatives of granular starch.

It is generally agreed in the art that the most practical method for derivatizing granular starch with organic reagents is to effect a reaction between the starch and a desired reagent in an aqueous medium. Such a derivatization process generally comprises slurrying the starch and reagent with water to form a reaction mixture which thereafter is heated and stirred to effect the reaction. It has been found that in order to effect a significant amount of reaction to thereby obtain more than a minute amount of starch derivative when using this prior art process, the reagent employed must be a substantial hydrophile. Such a requirement imposes a troublesome limtiation upon the types of reagents which may be used in what would otherwise be considered a valuable process.

Generally speaking, conventional reagents found useful in the above-described prior art process are organic compounds having from 1 to 4 carbon atoms, i.e., of relatively low molecular weight, which because of their relatively low molecular weight, exhibit a sufficient amount of hydrophilic tendencies to enable them to be used effectively. However, it has been found that when reagents, having more than 4 carbon atoms, i.e. reagents of relatively high molecular weight, are used, the hydrophobic tendencies of these compounds so reduce the amount of reaction as to render the basic prior art process economically unfeasible. Because of this problem, when the art was desirous of obtaining a starch derivative which could not be formed by using one of these reagents in the above prior art process because the reaction proceeds only to an insignificant degree, it has had to resort to other, less desirable methods of formulation.

Certain high molecular weight reagents are, of course, hydrophilic by nature and thus have been found to be useful in the same manner as the low molecular weight reagents. In both instances, however, and although the prior art slurry process has proved useful, its efficiency has not been optimized due to the fact that many of these reagents exhibit varying amounts of hydrophobic tendencies as well.

It is therefore evident that a need exists in the art for a technique which would render the aqueous slurry process of the prior art more efficient when using a wide variety of reagents including those reagents having more than 4 carbon atoms which are considered hydrophobic in nature.

SUMMARY OF THIS INVENTION

This invention contemplates an aqueous slurry process of forming granular starch derivatives by reacting them with a wide variety of reagents including those reagents having more than 4 carbon atoms which are hydrophobic in nature. Not only does the process of this invention render feasible the formulation of derivatives from high molecular weight, hydrophobic reagents but it increases the efficiency of the formulation of derivatives from reagents of low molecular weight which exhibit hydrophobic characteristics as well.

The term "hydrophobic" is used herein in its ordinary sense, i.e., to define that property of a substance which makes it at least partially incompatible with water. The term "hydrophobic reagent" when used in the discussion of this invention is therefore used for convenience to define those reagents of both high and low molecular weights which exhibit at least some incompatibility with water and thus either cannot be used effectively in the above-discussed prior art slurry technique or, if effectively useful in the prior art technique, are also, and preferably more, effectively and efficiently used in the process of this invention.

Basically the process contemplated by this invention comprises forming a reaction mixture comprising (1) granular starch (2) water, and (3) a hydrophobic reagent which is emulsified in the continuous aqueous phase by an emulsifier, and effecting a reaction within the mixture to thereby provide a significant amount of the desired starch derivative.

DETAILED DESCRIPTION OF THE INVENTION

The basic system contemplated by this invention for derivatizing starch by reacting a hydrophobic reagent with a granular starch in an aqueous medium is a three phase system of (1) granular starch (2) water, and (3) a hydrophobic reagent, which three phase system comprises an oil-in-water emulsion through the expedient of an emulsifier. The hydrophobic substance forms a dispersed phase in the three phase system while the water forms the continuous phase therein. The starch solid is a suspended solid which is primarily found in the aqueous phase and probably reacts at the oil-water interface.

Although not limited to any particular theory, it is believed that through the formation and use of this three phase system which includes an emulsified hydrophobic reagent, the water solubility of the hydrophobic reagent is sufficiently enhanced to allow it to be effectively reacted with a granular starch by aqueous reaction techniques. This appears to be true whether the hydrophobic reagent engaged is of high molecular weight or low molecular weight and thus appears to be true for substantially all hydrophobic reagents. In this respect then, there is no theoretical limit to the molecular weight or carbon atom content of the reagent used. As is clearly seen, such a system lends to the art a degree of flexibility which it heretofore did not have.

The above-described three phase system may be formulated in any convenient manner. For example, one convenient way in which it may be prepared is to first make a slurry of starch and water, which slurry preferably also includes an antiswelling agent (i.e. an agent which prevents the starch granules from swelling). This slurry is rendered alkaline by the addition thereto of a hydroxide base. To this alkaline slurry is then added with agitation, a separately formulated pre-emulsion comprised of water, emulsifier, and hydrophobic reagent. The reaction between the reagent and starch may then be effected by continued agitation and the addition of heat whereupon a reaction product, usually a solid, is formed. The reaction is then terminated by adjusting the pH to a slightly acidic level, i.e. about 5.0 to 6.9, as by the addition of a conventional mineral acid to the reaction mixture. The reaction product formed during the reaction is collected and purified according to conventional techniques such as by filtering, washing and air drying to thereby yield a starch derivative.

Although the above technique has proven quite useful for many systems, another technique as contemplated by this invention includes the formation of a system wherein the emulsified reagent phase includes a water immiscible liquid which is a solvent for the hydrophobic reagent. This technique is particularly useful where the reagent is a solid. In this technique of formulating the three phase system of this invention, the reagent composition of the above-described system is made by admixing the emulsifier and reagent in a water immiscible solvent (instead of in water) and then adding this mixture to the starch slurry wherein it is emulsified.

Of course it is realized that the water slurry and reagent composition as described in either of the above methods of formulating the systems of this invention need not be separately made. Rather, all of the initial ingredients may be simultaneously admixed together in the same reaction vessel if so desired. In either instance effective and efficient reactions are obtaned. Other variations such as adding the hydroxide base only after the slurry and reagent composition have been admixed, may also be used. The emulsion, as another variation, may be formed in situ by first adding the reagent to the slurry and then adding the emulsifier thereto. For these reasons, it is clear that the term "emulsified reagent composition," or the like, is used herein to define a specific phase as it exists and is emulsified in the overall three-phase reaction mixture of this invention, regardless of how the ingredients that form the emulsified phase were originally formulated. Such a term, therefore, is not limited to a system wherein the reagent is pre-emulsified and then is added to the granular starch and/or water. Rather such a term encompasses all reagent compositions comprised of an emulsifier and a reagent, which compositions exist as an emulsified phase in the three phase system of this invention regardless of whether they were in emulsified or non-emulsified form prior to being presented to the system. Also, it should be understood that while, for convenience sake the "emulsified reagent composition" is defined to include both the emulsifier and hydrophobic reagent, in the final three phase system the emulsifier acts as a bridge between the oil or hydrophobic phase and the aqueous phase, and as such will be found in both phases at the oil-water interface.

The derivatives which may be made by the methods and from the systems of this invention include, among others, such well known derivatives as the various ethers and esters of granular starch. Many derivatives which were formulated by non-aqueous techniques may now be formed using this invention.

Any of the well known granular starches may be used in the practice of this invention. Examples of such starches include corn, tapioca, wheat, potato, rice, sago, and grain sorghum starch.

Hydrophobic reagents contemplated for use in this invention are well known in the art. Generally speaking, any hydrophobic reagent may be used which is reactive with starch to form such linkages therewith as esters, ethers, carbonates and the like. Examples of applicable reagents include p-toluene sulfonyl chloride, 2-ethylbutyl chloroformate, phthalic anhydride, butadiene monoxide, and lauroyl chloride.

Still other hydrophobic reagents which are reactive with starch include unsaturated nitriles such as the higher homologues of acrylonitrile, phosphonium etherification reagents such as 2-chloroethyl tributyl phosphonium chloride, sulfonium etherifying reagents, such as 2-chloroethylmethyl-methylethyl sulfonium iodide, beta-chloroethyl-methyl-[2-(ethyl-methyl sulfonium) ethyl], sulfonium diiodide, methyl-cyclohexyl-chloroethyl sulfonium iodide, etc. Still other reactants include cyclic anhydrides, such as tetrabromophthalic anhydride, tetrahydrophthalic anhydride, allyl succinic anhydride, etc. Other anhydrides may also be used as adipic, pimelic, suberic, azelaic, sebacic, etc. Still further hydrophobes include 2,3 epoxy alcohols, halohydrins, alkyl isocyanates, cycloalkyl isocyanates, alkali metal cyanate salts, etc. Acids useful here include such as caproic acid, enanthic acid, caprylic acid, pelargonic acid, capric acid, n-undecyl acid, lauric acid, n-tridecyl acid, myristic acid, n-pentadecyl acid, palmitic acid, margaric acid, stearic acid, arachidic acid, behenic acid, n-tricosoic acid, lignoceric acid, n-pentacosic acid, cerotic acid, n-heptacosoic acid, montanic acid, melissic acid, n-hentriacentoic acid, ceroplastic acid, n-tetratriacontoic acid, and the like. Still other acids which may be used as a source of hydrophobe include caproleic acid, palmitoleic acid, sorbic acid linoleic acid, linolelaidic acid, punicic acid, linolenic acid, and the like.

A number of emulsifiers are useful in this invention. Typical are the partial fatty acid esters of polyhydric alcohols containing at least one polyoxyethylene chain, complete fatty acid esters of the condensation products of polyhydric alcohols and ethylene oxide in which all the hydroxyl groups of the alcohols contain polyoxyethylene chains, partial fatty acid esters of polyoxyethylene glycol and complete fatty acid esters of polyoxyethylene glycol, the oxyethylene units per mole of each of said members being at least five and each fatty acid group in said members containing at least 12 carbon atoms. More specific examples of this class of emulsifiers are the partial fatty acid esters of polyoxyethylene sorbitan, such as polyoxyethylene (20) sorbitan monostearate.

Still other emulsifiers useful here are glyceryl esters, particularly commercially available glyceryl mono-oleate, which is essentially a blend of glyceryl mono-oleate, glyceryl di-oleate and potassium oleate. Still further emulsifiers which may be employed here are diacetyl tartaric acid esters of mono- and diglycerides of fat-forming fatty acids. A commercially available product of this type consists of diacetyl tartaric acid esters of mono- and diglycerides of stearic and palmitic acids, and contains about 51% by weight hydrophilic and 49% lipophilic groups.

Still further emulsifiers include commercial soybean lecithin, which is a naturally occurring mixture of similar compounds identified as phosphatides or phospholipids, namely, lecithin (phosphatidyl choline), cephalin (phosphatidyl ethanolamine), lipositol or inositol phosphatides (phosphionositides) and related phosphorus - containing lipids. One such product contains from 54% to 72% phosphatides dissolved in soybean oil.

Another useful class of emulsifiers include the split lecithins. These products are commercially available and have had the ratio of phosphatides changed in order to accentuate their separate emulsifying and surface active properties.

Various mixtures and combinations of emulsifiers may also be used. A commercially available product, which is a blend of 3 parts glyceryl monostearate and 1 part stearyl-2-lactylic acid (sold under the trade name of Marvic acid) has been found particularly suitable.

The preferred class of emulsifiers for the purposes of this invention are the polyoxyethylene fatty acid esters. Examples of these esters include glyceryl mono-oleate, polyoxyethylene sorbitan esters, sodium di-isopropyl naphthalene sulfonate, polyoxyethylene sorbitan mono - laureate, and the like.

Antiswelling agents which inhibit starch swelling and hydroxide bases are conventional in the art. For purposes of this invention NaCl is a preferred antiswelling agent while NaOH is a preferred base. Other examples of antiswelling agents are KCl, $CaCl_2$, $Na_2SO_4$, $K_2SO_4$. Other examples of bases include KOH, $Ca(OH)_2$ and the like.

Solvents in which the above described reagents may be dissolved in order to carry out the preferred method of formulating the three phase system of this invention are well known in the art. Once given the above disclosure the choice of a particular solvent is well within the ingenuity of a skilled artisan. The only two major requirements necessary are that the solvent be a liquid solvent for the reagent and that it be substantially immiscible in water. Specific examples of useful solvents are toluene, benzene, xylene, and the like.

The water phase of the reaction systems of this invention may consist of water alone or be comprised of water and various hydrophilic solvents. Examples of such solvents which may be dissolved in the water phase of the reaction systems of this invention include such well known materials as the lower alkanols, such as, isopropanol, acetone, ethyl ether, and the like. Such solvents may be used either in major or minor amounts with the water but are preferably used in minor amounts.

It has been found that regardless of which of the above-described three phase systems is chosen, the starch products formed remain substantially granular throughout the reaction period and thus result in the formulation of a granular starch derivative. The efficacy of such a result is well understood by the art. The following examples serve to illustrate the unique features and characteristics of this invention. As such they are not meant as limitations thereon.

Example 1

One half mole (79 g. d.b.) of granular corn starch is added to 100 ml. of distilled water containing 5.0 grams of sodium chloride. Five hundredths (0.05) mole of caustic soda is added dropwise to the slurry with agitation. The alkaline slurry is transferred to a 500 ml., three-neck round bottom reaction flask. The reagent pre-emulsion is formed by first dissolving five hundredths (0.05) mole of p-toluene-sulfonyl chloride in 40.0 ml. of toluene, then adding the solution to a modified Waring blender vessel containing 50.0 ml. of water and 0.5 gram of a polyoxyethylene (20) sorbitan mono-laureate emulsifier under a high rate of agitation. The pre-emulsion so formed is added to the alkaline granular starch slurry at 40° C. to thereby form a three phase system. The reaction mixture is agitated for thirty minutes. At the end of the reaction time the pH is adjusted to 5.5. The product that forms is filtered, washed with one liter of water, washed with one liter of acetone, and air dried overnight.

For comparison, the above procedure is again followed except that no emulsifier is used. The results are as follows:

TABLE A

| Test | Percent sulfur in product (d.b.) | D.s.[1] |
|---|---|---|
| Without emulsifier | 0.44 | 0.023 |
| With emulsifier | 0.98 | 0.052 |

[1] D.s.=Degree of substitution.

Example 2

One mole (162 g. d.b.) of granular starch is added to 210 ml. of water containing 10.0 g. of sodium chloride. Thirteen hundredths (0.13) mole of caustic soda is added dropwise to the agitating slurry. After equilibration to 40° C., one tenth (0.10) mole of p-toluenesulfonyl chloride in 100 ml. of toluene and one gram of an all vegetable base ester emulsifier are added separately to the alkaline granular starch slurry to thereby form an emulsion. The reaction time is thirty minutes. At the end of the reaction period the pH is adjusted to 5.5. The product which forms is filtered, washed with a liter of water, washed with a liter of acetone, and air dried overnight.

For comparison, the above procedure is repeated except that the emulsifier is omitted. The following results are effected:

TABLE B

| Test | Percent sulfur in product (d.b.) | D.s.[1] |
|---|---|---|
| Without emulsifier | 0.33 | 0.017 |
| With emulsifier | 0.98 | 0.053 |

[1] See footnote at end of Table A.

Example 3

The general procedures of Example 2 are followed except that the reagent used is 2-ethylbutyl chloroformate. The results are as follows:

TABLE C

Test: D.s.
   Without emulsifier _____ 0
   With emulsifier _____ 0.046

Example 4

The general procedures of Example 2 are followed except that the reagent used is phthalic anhydride. The results are as follows:

TABLE D

Test: D.s.
   Without emulsifier _____ 0.027
   With emulsifier _____ 0.035

Example 5

The general procedures of Example 2 are followed except that the regent used is butadiene monoxide. The results are as follows:

TABLE E

Test: Reaction efficiency,[1] percent
   Without emulsifier _____ 0
   With emulsifier _____ 22

[1] Reaction efficiency=relative increase in amount of d.s. or yield per unit amount of reagent used.

Example 6

The general procedures of Example 2 are followed except that the reagent used is 2-lauroyl chloride and the reaction is conducted at 26° C. with pH held at 11.0 during the reaction. The results are as follows:

TABLE F

Test: Reaction efficiency, percent
   Without emulsifier _____ 0
   With emulsifier _____ 26

Example 7

An alkaline slurry is prepared which consists of 180 grams unmodified corn starch (97.7%, d.s.), 200 mls. of water containing 10 grams of sodium chloride (NaCl) and 0.13 mole of sodium hydroxide (NaOH). This slurry is then heated to 40° C. A reagent composition is prepared by adding to a volume of water either none or a small amount of polyoxyethylene mono-oleate emulsifier and a quantity of reagent as hereinafter indicated. This mixture, after agitation is then added to the alkaline starch slurry and reacted at 40° C. for the indicated length of time. The reaction is then terminated at the end of this time by adjusting the pH to 5.5. The reaction mixture is then filtered and the filter cake (starch derivative) is washed with water followed by a wash with a liter of acetone. The product is then air dried. The results are as follows:

TABLE G

| Reagent | Molar quantity of reagent | Reaction time, mins. | Percent sulfur in final product | D.s.[1] |
|---|---|---|---|---|
| A. p-Toluene sulfonyl chloride | 0.10 | 30 | | |
| 1. Without emulsifier | | | 0.29 | 0.015 |
| 2. With emulsifier | | | 0.95 | 0.051 |
| | | | Weight [2] | |
| B. 2-ethylbutyl chloroformate | 0.20 | 10 | | |
| 1. Without emulsifier | | | 158.4 | 0.017 |
| 2. With emulsifier | | | 166.4 | 0.039 |

[1] See footnote at end of Table A.
[2] Product (d.b. grams).

The products obtainable by the techniques hereinabove disclosed may generically be classified as starch derivatives. These compounds have well established utility in that they may be used as wet end additives for paper, sizings, dusting powders, and the like.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claim.

The invention is hereby claimed as follows:

1. A method of preparing a starch derivative comprising forming a reaction mixture comprising (1) granular starch, (2) water, (3) a hydrophobic reagent selected from the group consisting of an unsaturated nitrile, a phosphonium etherification reagent, a sulfonium etherification reagent, a cyclic anhydride, a 2,3-epoxy alcohol, an aliphatic carboxylic acid and an aliphatic unsaturated carboxylic acid (4) an emulsifier selected from the group consisting of soybean lecithin, split lecithin, glyceryl esters, partial fatty acid esters of a polyhydric alcohol containing at least one polyoxyethylene chain, complete fatty acid esters of the condensation product of a polyhydric alcohol and ethylene oxide in which all the hydroxy groups of the alcohols contain polyoxyethylene chains, partial fatty acid esters of polyoxyethylene glycol and a complete fatty acid ester of polyoxyethylene glycol, the oxyethylene units per mole of each of said members being at least five and each fatty acid group in said members containing at least 12 carbon atoms, (5) a hydroxide base and (6) an antiswelling agent selected from the group consisting of sodium chloride, potassium chloride, calcium chloride, sodium sulfate and potassium sulfate, effecting a reaction between the starch and the reagent at temperatures of from about 26° C. to about 40° C., and terminating the reaction by adjusting the pH to from about 5.0 to about 6.9.

References Cited

UNITED STATES PATENTS

| | | | |
|---|---|---|---|
| 2,853,484 | 9/1958 | Lolkema et al. | 260—233.3 |
| 3,096,232 | 7/1963 | Chapman | 162—172 |
| 3,108,891 | 10/1963 | Charon | 106—213 |
| 3,489,719 | 1/1970 | Savage et al. | 260—73 |

OTHER REFERENCES

Handbook of Chemistry and Physics, Chemical Rubber Publishing Co., Cleveland, March 1958, pp. 730 and 731.

DONALD E. CZAJA, Primary Examiner

M. I. MARQUIS, Assistant Examiner

U.S. Cl. X.R.

106—211 R, 213 R; 117—165 R; 162—175 R; 260—233.5 R